(12) United States Patent
Lee et al.

(10) Patent No.: US 7,405,791 B2
(45) Date of Patent: Jul. 29, 2008

(54) LIQUID CRYSTAL DISPLAY

(75) Inventors: Chang-Hun Lee, Suwon (KR);
Seung-Beon Park, Seoul (KR);
Jong-Kun Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/560,201

(22) Filed: Nov. 15, 2006

(65) Prior Publication Data

US 2007/0070277 A1      Mar. 29, 2007

Related U.S. Application Data

(62) Division of application No. 10/893,312, filed on Jul. 19, 2004, now Pat. No. 7,145,617.

(51) Int. Cl.
*G02F 1/1337* (2006.01)

(52) U.S. Cl. ........................... 349/129; 349/130

(58) Field of Classification Search .............. 349/129, 349/130
See application file for complete search history.

(56) References Cited

U.S. PATENT DOCUMENTS

| 6,424,398 B1 | 7/2002 | Taniguchi |
| 6,437,844 B1 | 8/2002 | Hattori et al. |
| 6,469,762 B1 * | 10/2002 | Hong et al. ................. 349/123 |
| 6,515,725 B1 | 2/2003 | Hattori et al. |
| 6,798,481 B2 * | 9/2004 | Kitson et al. ................ 349/129 |

FOREIGN PATENT DOCUMENTS

KR      1020000002546      1/2000

* cited by examiner

*Primary Examiner*—David C. Nelms
*Assistant Examiner*—David Y Chung
(74) *Attorney, Agent, or Firm*—Cantor Colburn LLP

(57) ABSTRACT

Disclosed is a liquid crystal display comprising a first substrate including wiring, which intersects to define unit pixels, and a first electrode formed in each unit pixel; a second substrate provided opposing the first substrate at a predetermined distance and including a second electrode formed over an entire surface of the second substrate, the second electrode generating an electric field with the first electrode; and a liquid crystal layer injected between the first substrate and the second substrate and including liquid crystal molecules that are horizontally oriented in one direction, the liquid crystal molecules, as a result of the electric field generated between the first and second substrates, having a symmetrically bent alignment about an imaginary center plane parallel to the first and second substrates at a center position therebetween, wherein the first electrode is protruded in a direction toward the second substrate at edges where orientation for the liquid crystal molecules starts.

8 Claims, 8 Drawing Sheets

LIQUID CRYSTAL DISPLAY

CROSS REFERENCE TO RELATED APPLICATIONS

This application is a divisional application of U.S. application Ser. No. 10/893,312 filed Jul. 19, 2004, which is a continuation application from U.S. patent application Ser. No. 10/322,704, filed Dec. 19, 2002, which is a Continuation Application from U.S. patent application Ser. No. 09/821,039, filed Mar. 30, 2001, which now became U.S. Pat. No. 6,535,259, all of which claim priority to Korean Patent Application No. 10-2000-16629, filed on Mar. 30, 2000, and all the benefits accruing therefrom under 35 U.S.C. § 119, the contents of all of the foregoing incorporated by reference in their entirety.

BACKGROUND OF THE INVENTION (a) Field of the Invention

The present invention relates to a liquid crystal display, and more particularly, to a liquid crystal display having a bent alignment of liquid crystal molecules to obtain a wide viewing angle and a fast response time.

(b) Description of the Related Art

Liquid crystal displays typically include a first substrate having common electrodes and a color filter, and a second substrate having thin film transistors and pixel electrodes. The first substrate and the second substrate are provided substantially in parallel with a predetermined gap therebetween, and liquid crystal is injected between the two opposing substrates. An electric field is formed between the substrates by applying different voltages to the pixel electrodes and common electrodes. Accordingly, the alignment of liquid crystal molecules of the liquid crystal material is varied to thereby control the transmittance of incident light.

Various types of liquid crystal displays have been developed to improve response times and viewing angle. They include the HAN (hybrid aligned nematic) mode liquid crystal display and the OCB (optically compensated bend) mode liquid crystal display. The OCB mode LCD includes an electrode formed on each opposing substrate, the electrodes acting to form an electric field that is perpendicular to the two substrates; liquid crystal injected between the two substrates; and an alignment layer formed on each substrate, the alignment layers providing a force to align the liquid crystal molecules in a direction substantially parallel to the two substrates.

In the OCB mode LCD, a symmetrical arrangement is realized about an imaginary center plane between the two substrates and parallel to the same. That is, the liquid crystal molecules are aligned substantially parallel to the substrates, then are increasingly slanted until reaching this center plane where the liquid crystal molecules are substantially perpendicular to the two substrates. A wide viewing angle is achieved as a result. To obtain such a bent alignment of the liquid crystal molecules, a horizontal alignment agent that is oriented in the same direction is used and a high voltage is initially applied. Also, since the liquid crystal molecules move in the same orientation when the LCD is operated, a wide viewing angle and a fast response time are realized.

However, in such a LCD, in areas where unit pixels begin, a smooth bending alignment of the liquid crystal molecules cannot be aligned in a smooth bending pattern, thereby limiting the display characteristics. This is a result of the opposing directions of the bending alignment of the liquid crystal molecules and the bending direction of the electric field at edges of the pixel electrodes. That is, unlike the common electrode, which is formed over an entire surface of the substrate, the pixel electrodes are divided for each pixel region such that this opposing direction of LC molecule alignment and electric field occurs at the edges of the pixel electrodes.

SUMMARY OF THE INVENTION

The present invention has been made in an effort to solve the above problems.

It is an object of the present invention to provide a liquid crystal display that realizes a stable bent alignment of liquid crystal molecules such that a wide viewing angle and fast response times are obtained.

To achieve the above object, the present invention provides a liquid crystal display comprising a first substrate including wiring, which intersects to define unit pixels, and a first electrode formed in each unit pixel; a second substrate provided opposing the first substrate at a predetermined distance from the same, and including a second electrode formed over an entire surface of the second substrate, the second electrode generating an electric field with the first electrode; and a liquid crystal layer injected between the first and second substrates and including liquid crystal molecules that are horizontally oriented in one direction, the liquid crystal molecules, as a result of the electric field generated between the first and second substrates, having a symmetrically bent alignment about an imaginary center plane parallel to the first and second substrates at a center position therebetween, wherein the first electrode is protruded in a direction toward the second substrate at edges where orientation for the liquid crystal molecules starts.

According to a feature of the present invention, a protrusion pattern is formed under the first electrode.

According to another feature of the present invention, a thickness of the protrusion pattern is 1-4 μm.

According to yet another feature of the present invention, the wiring includes gate lines for transmitting gate signals, and data lines intersecting the gate lines and transmitting image signals.

According to still yet another feature of the present invention, the liquid crystal display further comprises storage capacitance wiring formed on a same layer as the gate lines but separated from the same, the storage capacitance wiring overlapping the first electrode.

According to still yet another feature of the present invention, the first substrate includes a thin film transistor having a gate electrode formed at areas where the gate lines intersect the data lines and connected to the gate lines, a source electrode connected to the data lines, a drain electrode opposing the source electrode with respect the gate electrode, and a semiconductor layer.

According to still yet another feature of the present invention, the protrusion pattern is formed on a same layer as organic insulation material, the gate lines, or the semiconductor layer.

According to still yet another feature of the present invention, first and second orientation layers are formed respectively on the first and second substrates, the orientation layers providing an orienting force to the liquid crystal molecules in an identical direction horizontal to the substrates.

According to still yet another feature of the present invention, the liquid crystal layer has a positive anisotropic dielectricity.

In another aspect, the present invention provides a liquid crystal display comprising a first substrate including wiring, which intersects to define unit pixels, and a first electrode formed in each unit pixel; a second substrate provided opposing the first substrate at a predetermined distance from the same, and including a second electrode formed over an entire surface of the second substrate, the second electrode generating an electric field with the first electrode; a liquid crystal layer injected between the first and second substrates and including liquid crystal molecules that are horizontally oriented in one direction, the liquid crystal molecules, as a result of the electric field generated between the first and second substrates, having a symmetrically bent alignment about an imaginary center plane parallel to the first and second substrates at a center position therebetween; and a protrusion pattern formed on the first substrate or second substrate, the protrusion pattern forming a slanted surface that opposes an orientation direction at edges of the unit pixels where orientation of the liquid crystal molecules begins or ends.

According to a feature of the present invention, the liquid crystal molecules have a larger pretilt angle with respect to the first and second substrates at the edges of the unit pixels than at other areas.

According to another feature of the present invention, the wiring includes gate lines for transmitting gate signals, and data lines intersecting the gate lines and transmitting image signals.

According to yet another feature of the present invention, the first substrate includes a thin film transistor having a gate electrode formed at areas where the gate lines intersect the data lines and connected to the gate lines, a gate insulation layer covering the gate electrode, a semiconductor layer formed over the gate insulation layer, a source electrode connected to the data lines, and a drain electrode opposing the source electrode with respect the gate electrode.

According to still yet another feature of the present invention, the protrusion pattern is formed on a same layer as organic insulation material, the gate lines, the semiconductor layer, or the data lines.

According to still yet another feature of the present invention, wherein the liquid crystal display further comprises storage capacitance wiring formed on a same layer as the gate lines but separated from the same, the storage capacitance wiring overlapping the first electrode.

According to still yet another feature of the present invention, the protrusion pattern forms a depression on the first and second substrates at edges of the unit pixels where orientation of the liquid crystal molecules starts.

According to still yet another feature of the present invention, the protrusion pattern is formed on the first and second substrates at edges of the unit pixels where orientation of the liquid crystal molecules ends.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

In the present invention, in order to obtain a stable bent alignment of liquid crystal molecules, a structure of electrodes is altered such that a direction of an electric field corresponds to a bent alignment direction or orientation direction of the liquid crystal molecules, or a pretilt angle of the liquid crystal molecules is raised by the formation of grooves or protrusions.

Figure 1:
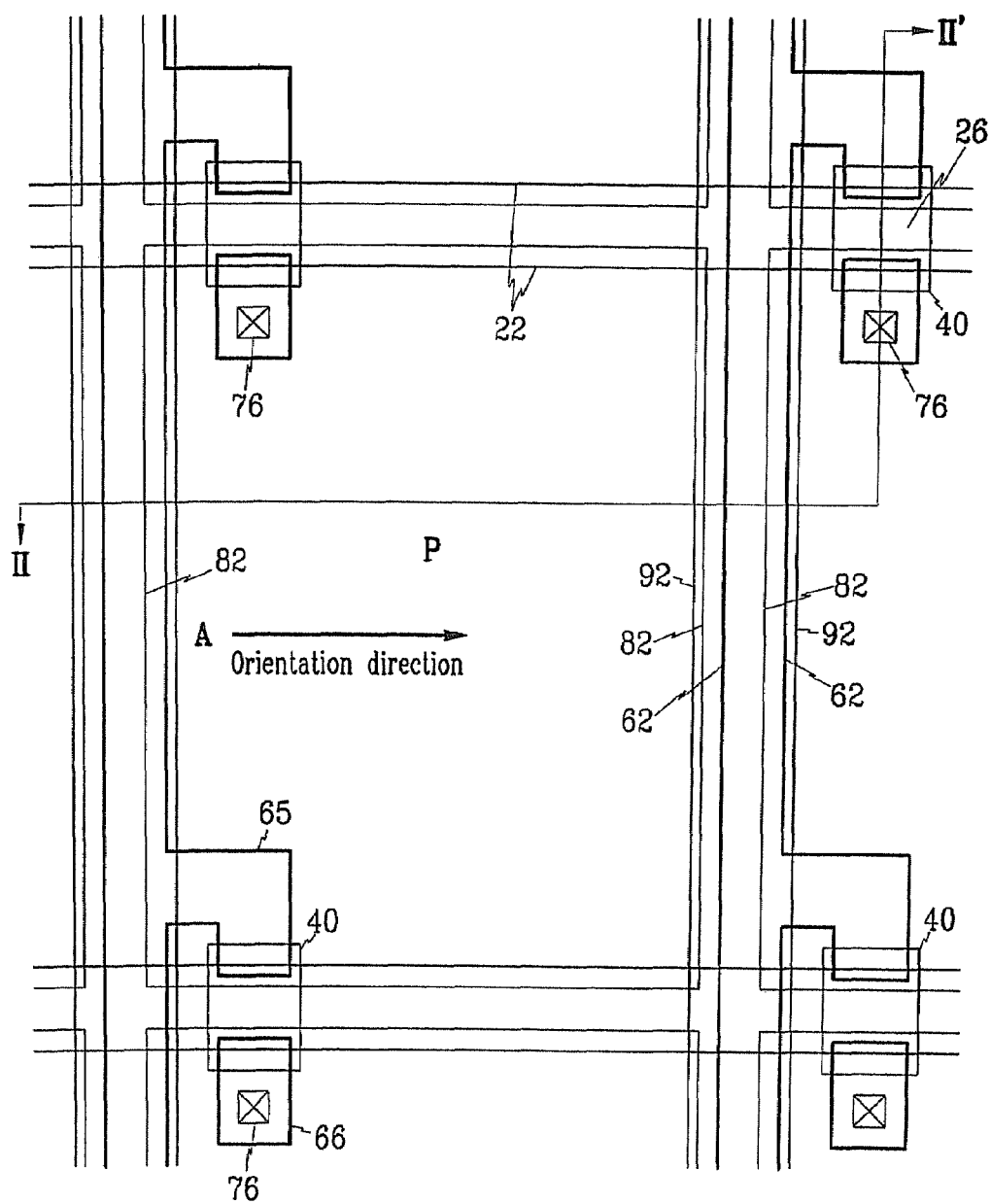
FIG. 1 is a schematic plan view of a TFT substrate used in a liquid crystal display according to a first preferred embodiment of the present invention.
Figure 2:
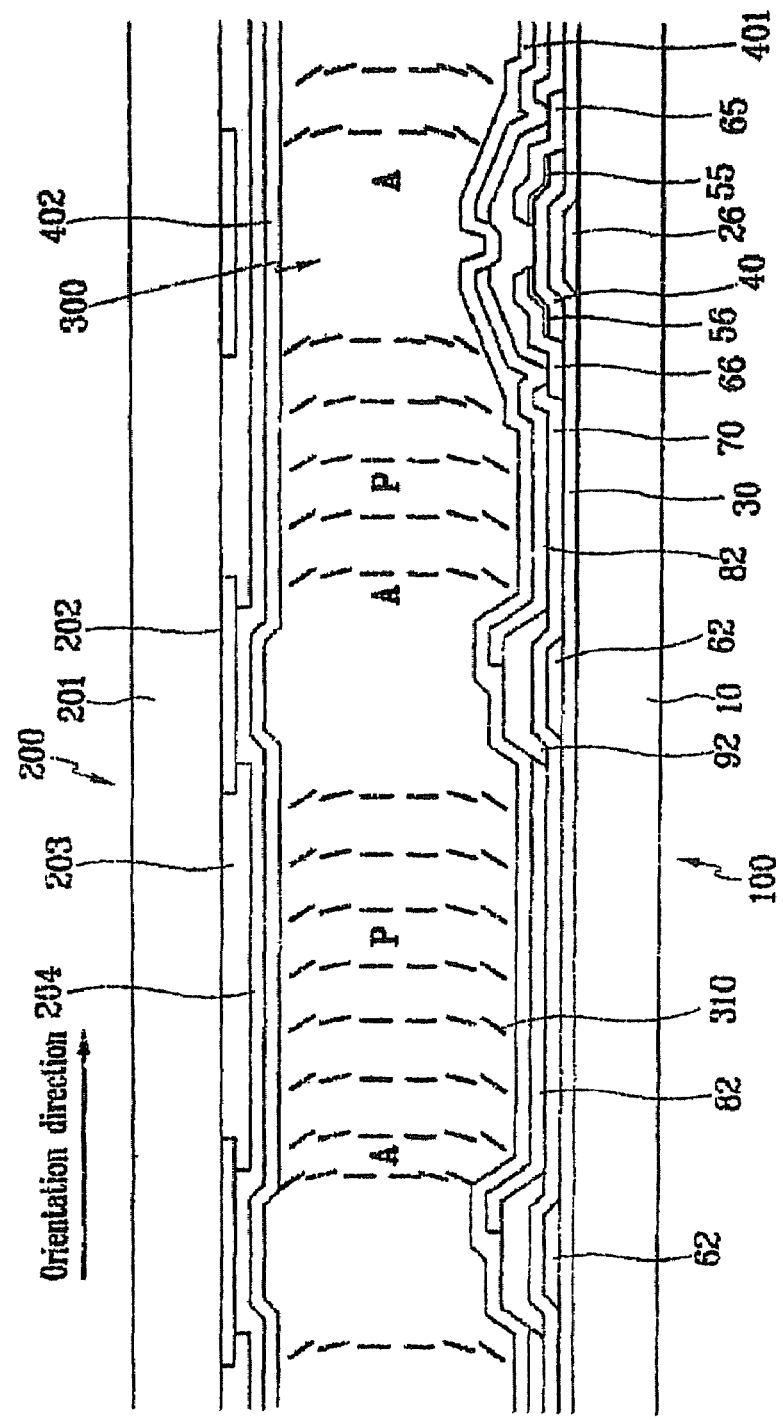
FIG. 2 is a sectional view taken along line II-II' of FIG. 1.

FIG. 1 shows a schematic plan view of a TFT substrate used in a liquid crystal display according to a first preferred embodiment of the present invention, and FIG. 2 shows a sectional view taken along line II-II' of FIG. 1. A color filter substrate is shown together with the TFT substrate in FIG. 2.

The liquid crystal display includes a lower substrate 100 (the TFT substrate) and an upper substrate 200 (the color filter substrate). The lower and upper substrates 100 and 200 are positioned substantially in parallel with a predetermined gap therebetween. The lower substrate 100 includes a lower insulation substrate 10, and gate wiring formed of a low-resistance conductive material over the insulation substrate 10. The gate wiring includes gate lines 22 extended horizontally (in FIG. 1) and gate electrodes 26 of a thin film transistor, the gate electrodes 26 being connected to the gate lines 22. The gate wiring also includes gate pads (not shown) connected to ends of the gate lines 22 for transmitting gate signals thereto.

A gate insulation layer 30 made of $SiN_x$ is formed on top of the lower insulation substrate 10 to cover the gate lines 22 and the gate electrodes 26. A semiconductor layer 40 made of a semiconductor material such as amorphous silicon is formed over the gate insulation layer 30, and ohmic contact layers 55 and 56 are formed over the semiconductor layer 40. The ohmic contact layers 55 and 56 are made of a material such as n+ hydrogenated amorphous silicon, on which is n-type impurities at a high concentration, or doped silicide.

Data wiring made of a conductive material such as metal is formed over the ohmic contact layers 55 and 56 and gate insulation layer 30. The data wiring includes data lines 62 formed vertically (in FIG. 1) to intersect the gate lines 22, thereby defining unit pixels P; source electrodes 65 branched from the data lines 62 and extending to partially cover the ohmic contact layer 55; and drain electrodes 66 separated from the source electrodes 65 and formed on top of the ohmic contact layer 56 extending in a direction opposite the drain electrodes 66 with respect to the gate electrodes 26. The data wiring also includes data pads (not shown) connected to one end of the data lines 62. The data pads receive image signals.

A protection layer 70 is formed over the semiconductor layer 40 and portions of the data wiring that the semiconductor layer 40 does not cover. Contact holes 76 are formed in the protection layer 70 to expose the drain electrodes 66. Additional contact holes may be formed in the protection layer 70 to expose the data pads, gate pads, and the gate insulation layer 30.

A protrusion pattern 92 that is lined up vertically (in FIG. 1) with the data lines 62 is formed over the protection layer 70. To minimize signal interference between the data lines 62 and pixel electrodes 82 (to be described hereinafter), the protrusion pattern 92 is preferably made of an organic insulation material having a low anisotropy, and is between 1-4 μm in height. The protrusion pattern 92 can be made of an organic insulation material that is sensitive to light. Also, the protrusion pattern 92 can be formed on the same layer as the gate wiring, semiconductor layer 40, and the ohmic contact layers 55 and 56.

The pixel electrodes 82, which are made of a clear conductive material such as IZO (indium zinc oxide) or ITO (indium tin oxide), are formed on the protection layer 70. The pixel electrodes 82 are electrically connected to the drain electrodes 66 via the contact holes 76 of the protection layer 70. It is possible to form auxiliary gate pads and auxiliary data pads on the same layer as the pixel electrodes 82, with the auxiliary gate pads and auxiliary data pads contacting the gate pads and data pads, respectively, through the contact holes 76 of the protection layer 70. With reference to FIG. 2, edges of the pixel electrodes 82 where orientation starts are extended to partially overlap the protrusion pattern 92 in each unit pixel P. As a result, a bent fringe field at an area A in each pixel unit P where orientation starts is identically formed to a bent alignment direction of liquid crystal molecules 310 of a liquid crystal layer 300.

The pixel electrodes 82, with reference to FIG. 1, overlap the gate lines 22 to realize a storage capacitor, and when a storage capacitance is insufficient, it is possible to add wiring for storage capacitance on the same layer as the gate wiring and adjacent to the data lines 62. This will be described in more detail hereinbelow.

An upper insulation substrate 201 forms the upper substrate 200 and is located opposite the lower insulation substrate 10. A black matrix 202 having an opening pattern is formed on the upper insulation substrate 201, and a color filter 203 is formed in the openings of the black matrix 202 partially overlapping the black matrix 202. Areas where the color filter 203 is formed correspond to the unit pixels P. A common electrode 204 is formed over the black matrix 202 and the color filter 203.

Formed as innermost layers of the lower insulation substrate 10 and the upper insulation substrate 201 are alignment layers 401 and 402, respectively. The alignment layers 401 and 402 provide a force to orient the liquid crystal molecules 310 of the liquid crystal layer 300 in nearly a direction parallel to the lower and upper insulation substrates 10 and 201. Here, liquid crystal of the liquid crystal layer 300 has a positive anisotropic dielectricity.

In a state where a critical voltage is applied to the pixel electrodes 82 and the common electrode 204, the liquid crystal molecules 310 of the liquid crystal layer 300 adjacent to the lower and upper insulation substrates 10 and 201 are aligned at a specific angle with respect to the substrates 10 and 201 due to the force of the orientation layers 401 and 402, as well as the characteristics of the liquid crystal molecules 310. However, as approaching an imaginary center plane, which is parallel to the substrates 10 and 201 at a center position therebetween the liquid crystal molecules 310 are increasingly bent as a result of the electric field formed between the substrates 10 and 201 (and the decreasing influence of the orienting force of the alignment layers 401 and 402) until becoming substantially perpendicular to the substrates 10 and 201 at the center plane. Accordingly, the liquid crystal molecules 310 form two symmetrical regions about the center plane to compensate for a phase retardation of light passing through the liquid crystal layer 300. A wide viewing angle is obtained as a result.

Since the protrusion pattern 92 is formed at edges of the unit pixels P where orientation starts (areas A), the pixel electrodes 82 at these regions are raised since they are formed partially over the protrusion pattern 92. As a result, the electric field at areas A is bent identically to the bent alignment direction of the liquid crystal molecules 310 such that a smooth bent alignment of the liquid crystal molecules 310 occurs. That is, it can prevent the broken bent alignment of the liquid crystal molecules 310 of the prior art resulting from opposing directions of the electric field and alignment of the liquid crystal molecules.

In the first preferred embodiment of the present invention described above, liquid crystal molecules are oriented in the horizontal direction (in FIG. 1) and the protrusion pattern 92 is formed in the vertical direction (in FIG. 1). However, if the liquid crystal molecules are set to be oriented in the vertical direction, the protrusion pattern 92 can be formed at areas where orientation starts in the unit pixels P in parallel with the gate wiring.

Figure 3:
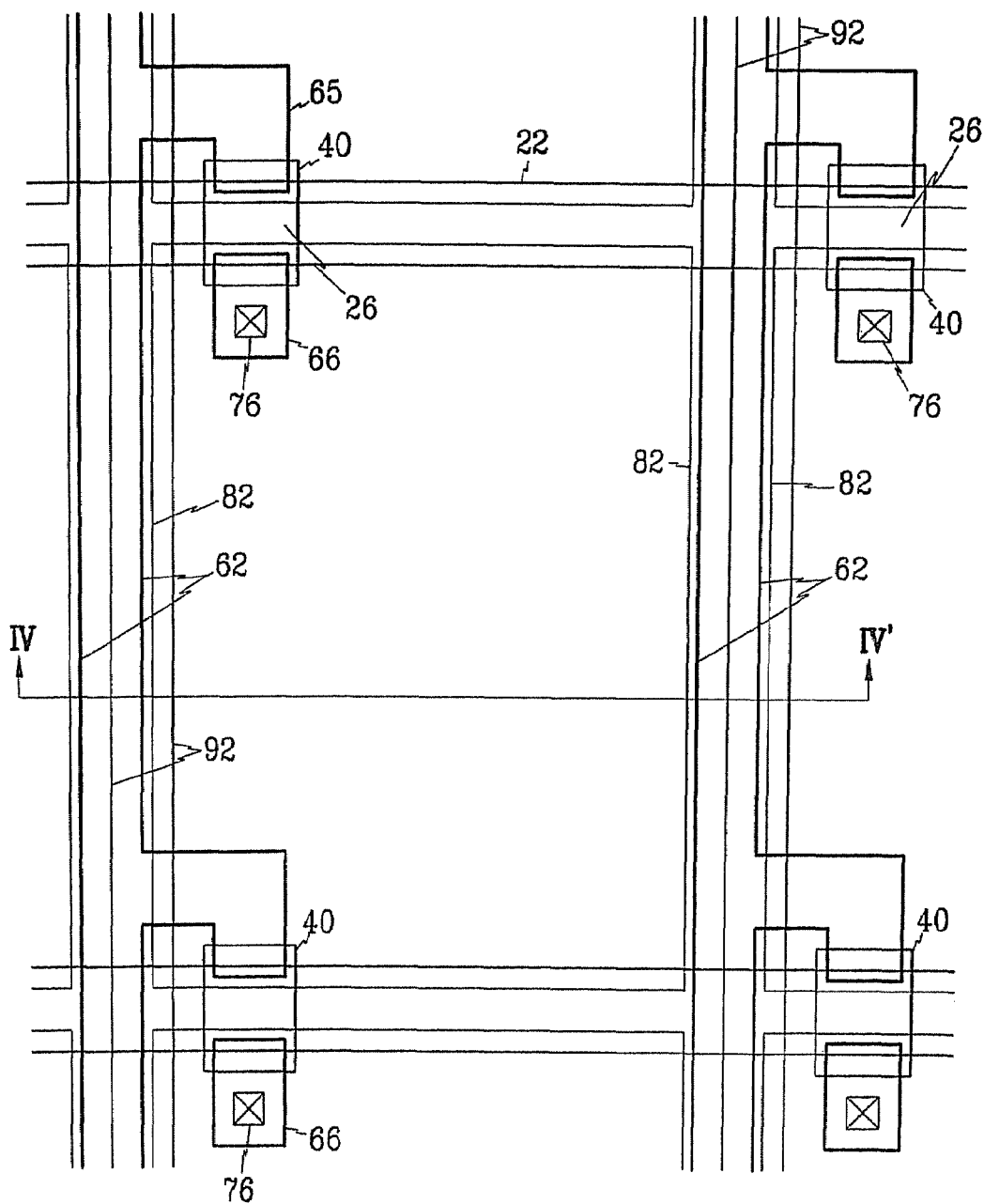
FIG. 3 is a schematic plan view of a TFT substrate used in a liquid crystal display according to a second preferred embodiment of the present invention.
Figure 4:
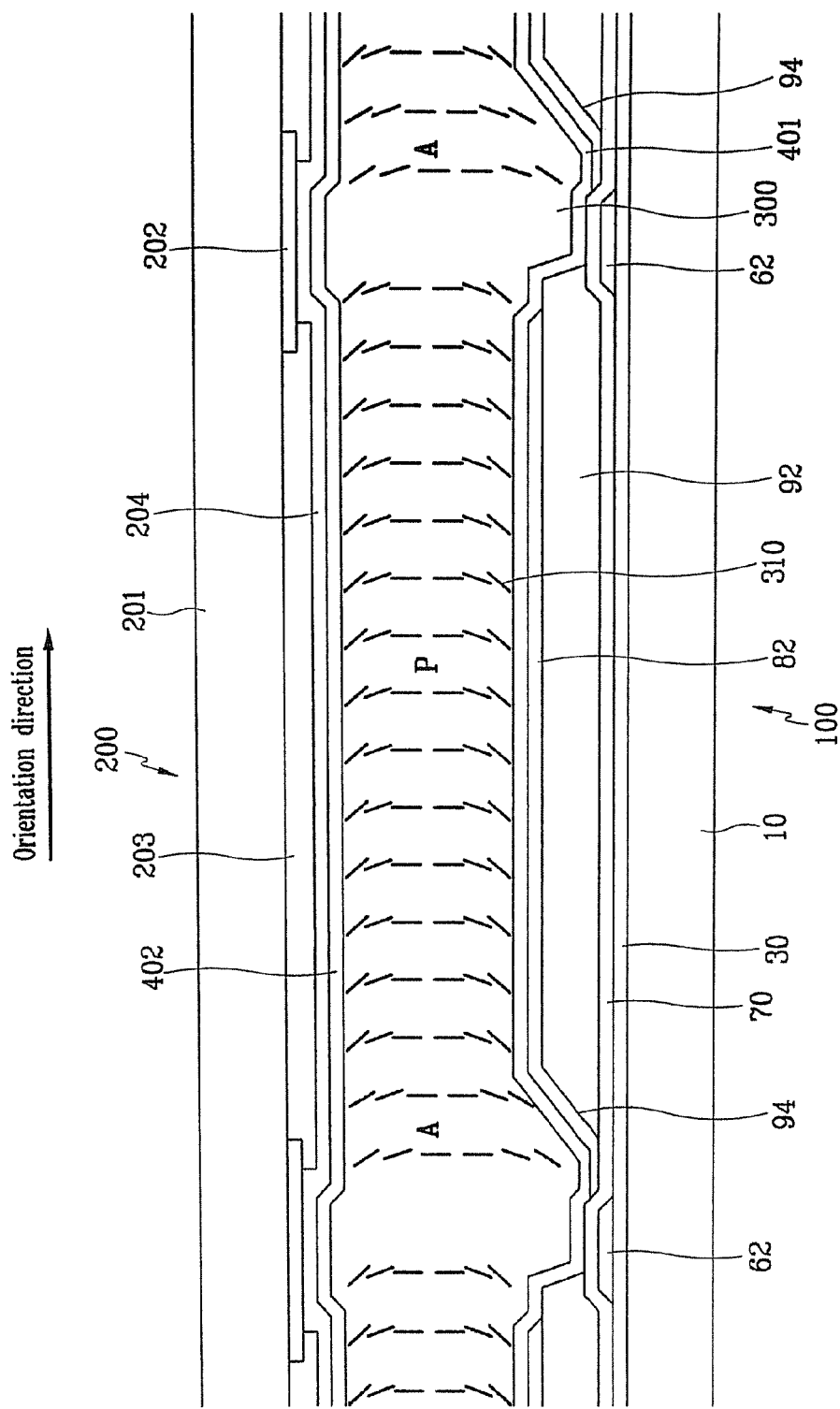
FIG. 4 is a sectional view taken along line IV-IV' of FIG. 3.

FIG. 3 shows a schematic plan view of a TFT substrate used in a liquid crystal display according to a second preferred embodiment of the present invention. FIG. 4 is a sectional view taken along line IV-IV' of FIG. 3. Since much of the structure is similar to the first preferred embodiment, only differences in structure from the first preferred embodiment will be described. Like reference numerals will be used for like elements.

An organic insulation layer pattern 92 is formed over the protection layer 70. The organic insulation layer pattern 92 is formed in parallel with the data lines 62 and has a slanted region 94 that opposes an orientation direction (shown by the arrow) at areas A. Here, if the orientation direction is perpendicular to the direction shown in FIG. 4, the organic insulation layer pattern 92 may be formed in parallel with the gate lines 22.

Since the alignment layer 401 is formed over the organic insulation layer pattern 92, and therefore following the slanted region 94 of the organic insulation layer pattern 92, a depression is formed at the areas A. As a result, the liquid crystal molecules 310 adjacent to the lower insulation substrate 10 are aligned having a pretit angle with respect to the surface of the lower insulation substrate 10. That is, at areas A, the liquid crystal molecules 310 are aligned having a larger pretilt angle than at other areas. Accordingly, the liquid crystal molecules 310 are minimally influenced by the electric field at areas A and are stably aligned in a bent formation even with the generation of a bent fringe field at edges of the unit pixels P. Therefore, it can prevent the broken bent alignment of the liquid crystal molecules 310 of the prior art resulting from opposing directions of the electric field and alignment of the liquid crystal molecules.

Although the organic insulation layer pattern 92 having the slanted region 94 is described as formed on a separate layer as the other elements formed on the lower insulation substrate 10, it is possible for the organic insulation layer pattern 92 to be formed on the same layer as the gate wiring, gate insulation layer 30, semiconductor layer 40, ohmic contact layers 55 and 56, data wiring, or protection layer 70. Further, a protrusion pattern can be formed to generate the slanted region 94 at the areas A rather than elevating an area between the areas A as in the second embodiment described above. Also, a protrusion or depression pattern can be formed at the areas A on the upper insulation substrate 201 to better achieve the stable bent alignment of the liquid crystal molecules 310.

Figure 5:
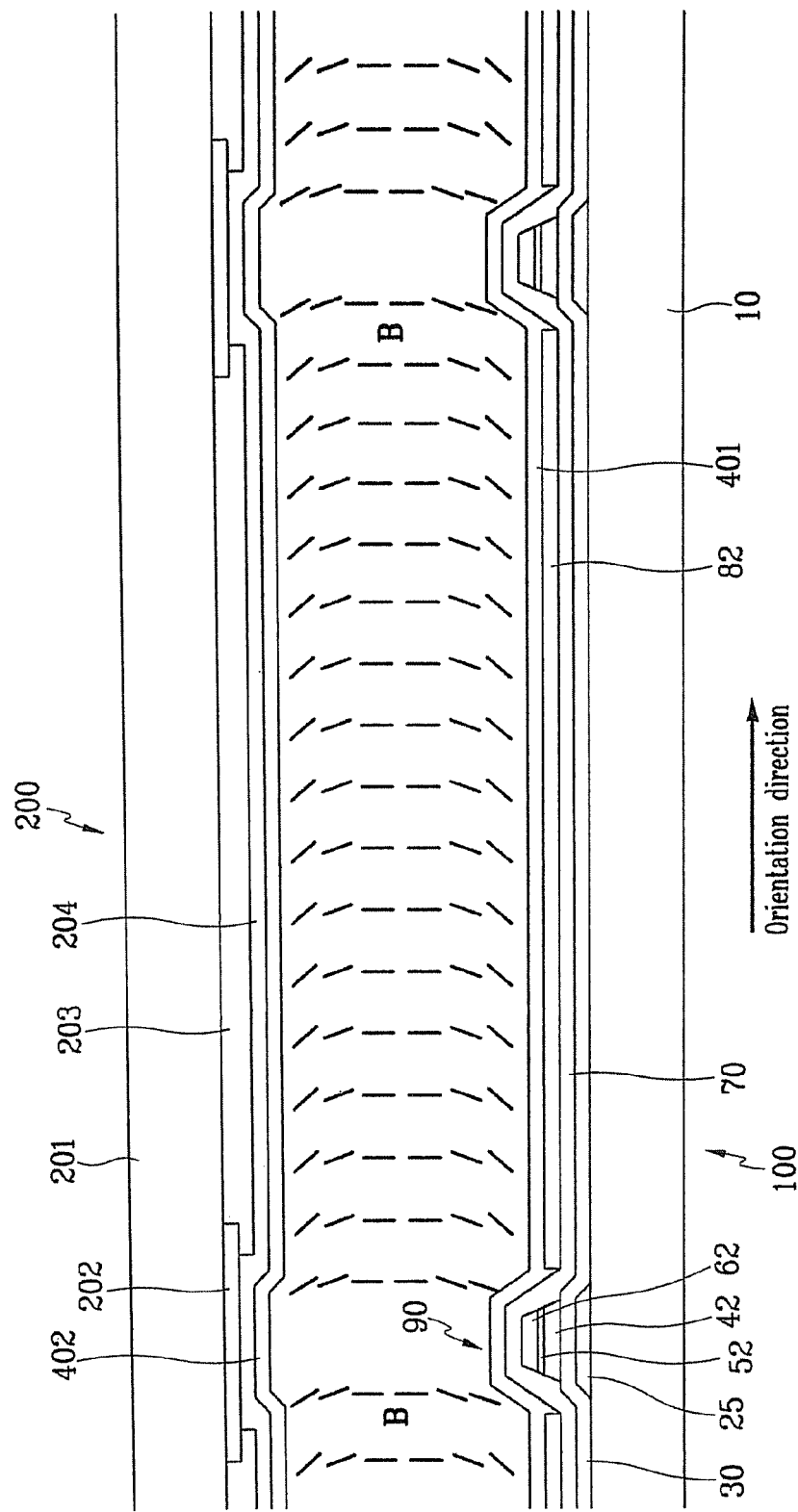
FIG. 5 is a sectional view of a liquid crystal display according to a third preferred embodiment of the present invention.

FIG. 5 shows a sectional view of a liquid crystal display according to a third preferred embodiment of the present invention. Since much of the structure is similar to the first preferred embodiment, only differences in structure from the first preferred embodiment will be described. Like reference numerals will be used for like elements.

As shown in the drawing, a protrusion pattern 90 is formed at areas B where orientation ends. The protrusion pattern 90 results in a slanted surface opposing an orientation direction (→). The protrusion pattern 90 includes a first pattern 25 formed on the same layer as the gate wiring, a second pattern 42 formed on the same layer as the semiconductor layer 40, and a third pattern 52 formed on the same layer as the ohmic contact layers 55 and 56. The data lines 62 are formed over the third pattern 52. It is possible to form the protrusion pattern 90 one, two or more of the patterns 25, 42, and 52, or can be formed using a separate organic insulation layer.

In the above structure, the alignment layer 401 is formed over the provided pattern (i.e., the protrusion pattern 90) as with the second embodiment. Accordingly, the liquid crystal molecules 310 aligned over the slanted surface of the protrusion pattern 90 have a pretilt angle with respect to the substrate 10. That is, the liquid crystal molecules 310 are aligned having a larger pretilt angle with respect to the substrate 10 at the areas B than at other areas. As a result, a stable bent alignment of the liquid crystal molecules 310 is obtained. Also, a protrusion or depression pattern can be formed on the upper insulation substrate 201 to better achieve the stable bent alignment of the liquid crystal molecules 310.

Figure 6:
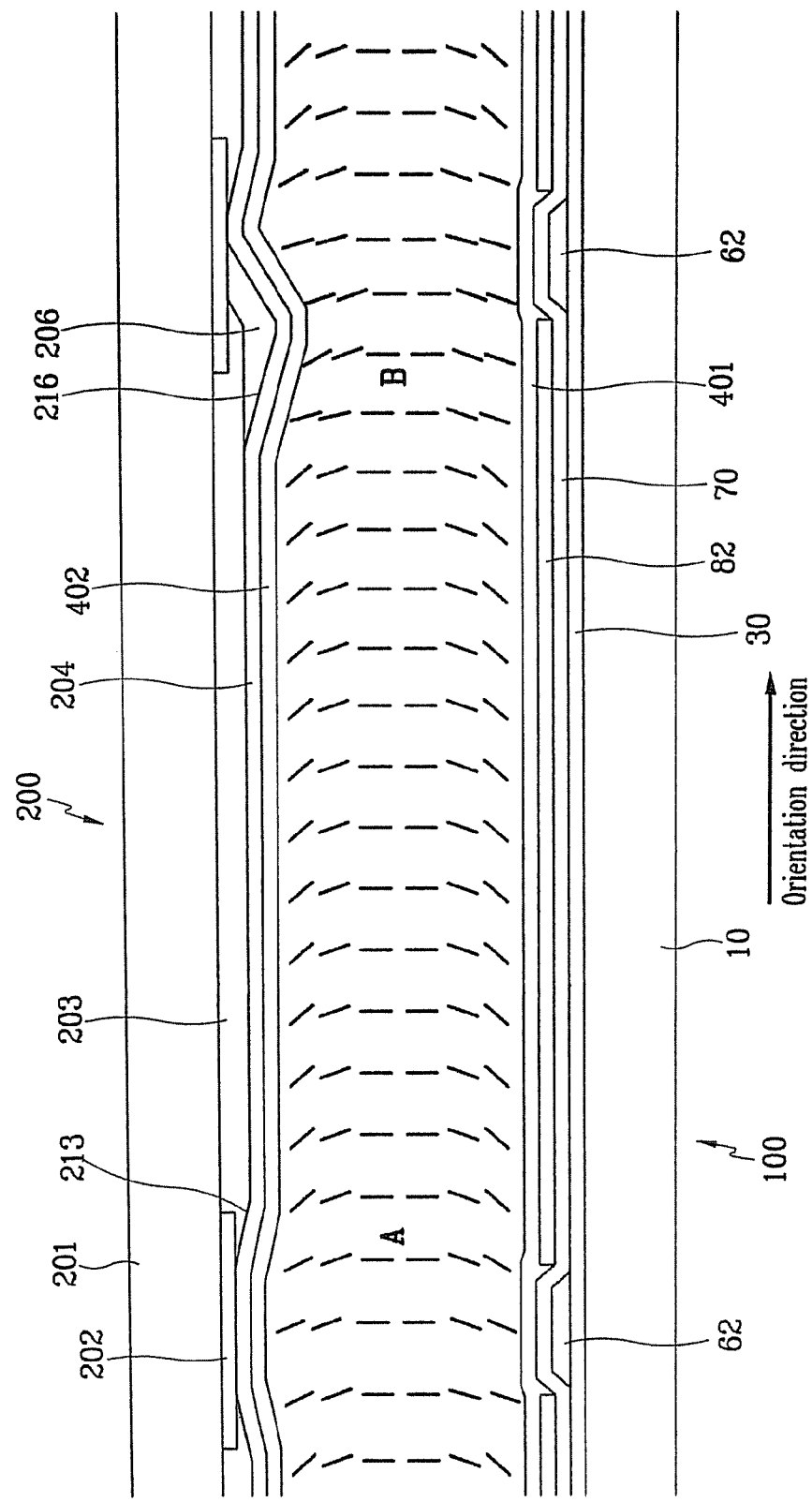
FIG. 6 is a sectional view of a liquid crystal display according to a fourth preferred embodiment of the present invention.

FIG. 6 shows a sectional view of a liquid crystal display according to a fourth preferred embodiment of the present invention. Since much of the structure is similar to the first preferred embodiment, only differences in structure from the first preferred embodiment will be described. Like reference numerals will be used for like elements.

As shown in the drawing, the color filter 203 of the upper insulation substrate 201 is formed having a slanted surface 213 that opposes an orientation direction (→) at areas A where orientation begins. Also, a protrusion pattern 206 is formed over the color filter 203 and the black matrix 202 is a protrusion pattern 206 having a slanted surface 216 that opposes the orientation direction (→) at the areas B where orientation ends.

In the above structure, the orientation layer 402 is formed over the provided pattern as with the above second and third embodiments. Accordingly, the liquid crystal molecules 310 aligned over the slanted surface of the protrusion pattern 90 have a pretilt angle with respect to the substrate 10. That is, the liquid crystal molecules 310 are aligned having a larger pretilt angle with respect to the substrate 10 at the areas A and B than at other areas. As a result, a stable bent alignment of the liquid crystal molecules 310 is obtained both where orientation starts and ends.

Figure 7:
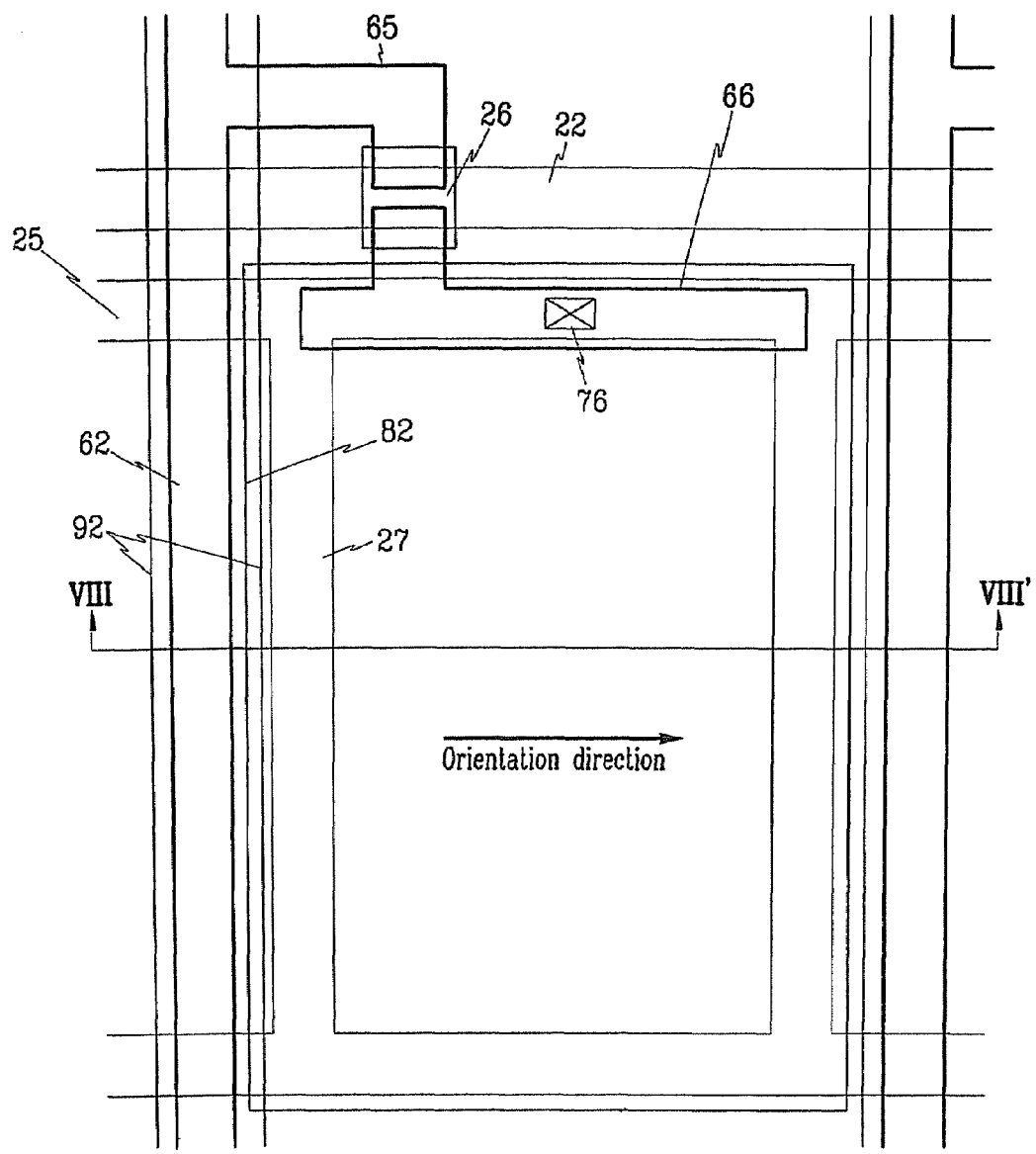
FIG. 7 is a schematic plan view of a TFT substrate used in a liquid crystal display having independent storage capacitance wiring according to a fifth preferred embodiment of the present invention.
Figure 8:
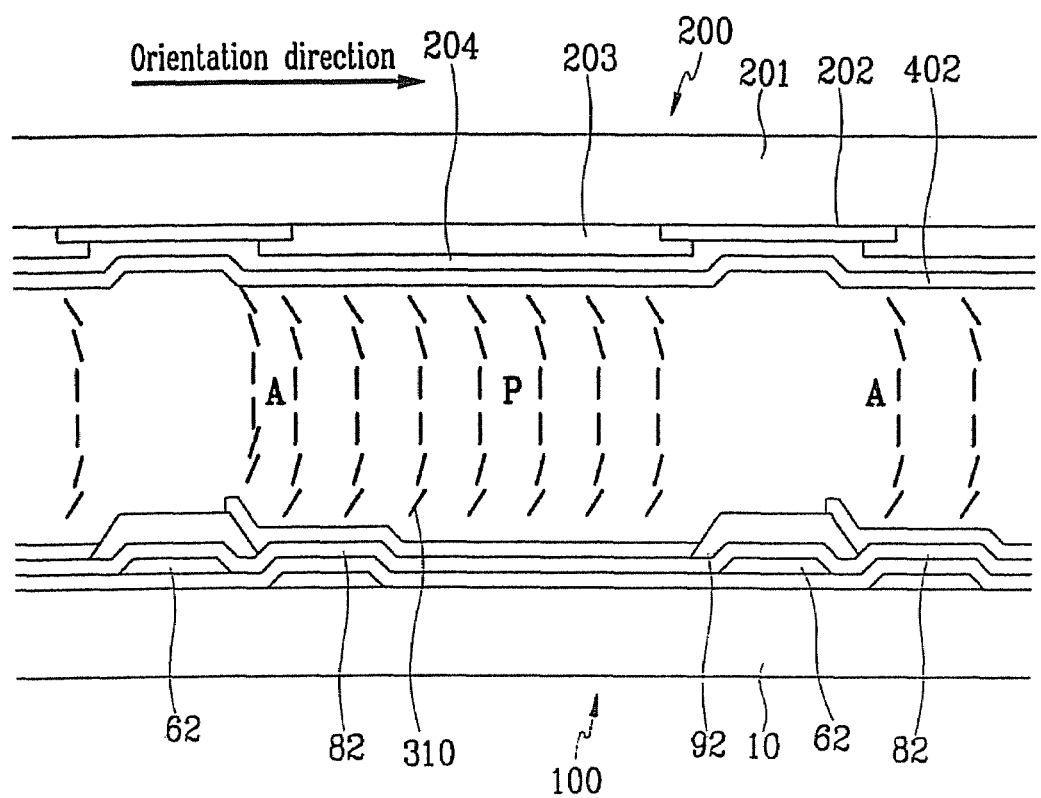
FIG. 8 is a sectional view taken along line VIII-VIII' of FIG. 7.

FIG. 7 shows a schematic plan view of a TFT substrate used in a liquid crystal display having independent storage capcitance wiring according to a fifth preferred embodiment of the present invention. FIG. 8 is a sectional view taken along line VII-VII' of FIG. 7. Since much of the structure is similar to the first preferred embodiment, only differences in structure from the first preferred embodiment will be described. Like reference numerals will be used for like elements.

Storage capacitance wiring is formed on the same layer as the gate wiring but separated from it. The storage capacitance wiring overlaps the pixel electrode 82. The storage capacitance wiring includes storage electrode lines 25 formed extending in the same direction as the gate line 22 (i.e., horizontally in FIG. 7) and at two ends of a unit pixel P, and a storage electrode 27 formed vertically (in FIG. 7) to interconnect the storage electrode lines 25. The drain electrode 66 is extended horizontally (in FIG. 7) to overlap one of the storage electrode lines 25, thereby ensuring a sufficient storage capacitance. In the fifth embodiment, a boundary of the protrusion pattern 92 is positioned between the data lines 62 and storage electrodes 27. However, it is possible that the boundary of the protrusion pattern 92 extend over the storage electrodes 27, and a boundary of the pixel electrode 82 can be formed over the data lines 62 as in the first embodiment.

In the fifth embodiment, with the addition of the independent storage capacitance wiring to the basic structure of the first embodiment, a stable bent alignment of the liquid crystal molecules 310 is obtained. This can also be achieved through configurations outlined in the second, third and fourth embodiments. That is, the independent storage capacitance wiring can be added also to the basic structures of the second, third and fourth embodiments.

Although preferred embodiments of the present invention have been described in detail hereinabove, it should be clearly understood that many variations and/or modifications of the basic inventive concepts herein taught that may appear to those skilled in the present art will still fall within the spirit and scope of the present invention, as defined in the appended claims.

What is claimed is:

1. A liquid crystal display (LCD), comprising:
    a first substrate;
    a gate line formed on the first substrate;
    a second substrate facing the first substrate and opposite thereto;
    a data line formed on the first substrate and intersecting the gate line, wherein the intersection of the gate line and the data line defines the pixel region;
    an alignment layer formed over at least one of the first substrate and the second substrate and applying an orientation force to the liquid crystal layer;
    a pixel region formed between the first substrate and the second substrate;
    an electrode formed on at least one of the first and second substrates comprises a pixel electrode formed at the pixel region on the first substrate;
    a liquid crystal layer disposed between the first substrate and the second substrate;
    a protrusion formed on at least one of the first substrate and the second substrate, the protrusion extending obliquely from the at least one of the first substrate and the second substrate and influencing the liquid crystal layer to exhibit a stable bent alignment within the pixel region; and
    a slant region formed on at least one of the first substrate and the second substrate near a first edge of the pixel region,
    wherein a base of the protrusion formed on at least one of the first substrate and the second substrate is located equidistant to or further from the opposing substrate than a base defining the electrode extending from one of the first and second substrates.

2. The LCD of claim 1, wherein a direction from the first edge to a second edge of the pixel region facing the first edge is substantially the same with a direction of the orientation force.

3. The LCD of claim 2, wherein the slant region is formed on the first substrate.

4. The LCD of claim 1, wherein a direction from the first edge to a second edge of the pixel region facing the first edge is substantially opposite to a direction of the orientation force.

5. The LCD of claim 4, wherein the slant region is formed on the second substrate.

6. The LCD of claim 1, wherein the slant region is formed by an insulating pattern formed on the first substrate or the second substrate.

7. The LCD of claim 6, wherein the insulating pattern has a slanted edge portion.

8. The LCD of claim 6, wherein the insulating pattern is formed of an organic insulating material.

\* \* \* \* \*